United States Patent
Matera

(10) Patent No.: US 12,552,331 B2
(45) Date of Patent: Feb. 17, 2026

(54) VEHICULAR LIQUID STORAGE SYSTEM

(71) Applicant: Rivian IP Holdings, LLC, Irvine, CA (US)

(72) Inventor: Matthew James Matera, Newport Beach, CA (US)

(73) Assignee: RIVIAN IP HOLDINGS, LLC, Plymouth, MI (US)

( * ) Notice: Subject to any disclaimer, the term of this patent is extended or adjusted under 35 U.S.C. 154(b) by 840 days.

(21) Appl. No.: 17/843,092

(22) Filed: Jun. 17, 2022

(65) Prior Publication Data

US 2023/0406234 A1    Dec. 21, 2023

(51) Int. Cl.
| | |
|---|---|
| B60R 15/02 | (2006.01) |
| B60N 3/10 | (2006.01) |
| B60N 3/16 | (2006.01) |
| B60N 3/18 | (2006.01) |
| B60S 1/00 | (2006.01) |

(52) U.S. Cl.
CPC .............. B60R 15/02 (2013.01); B60N 3/104 (2013.01); B60N 3/16 (2013.01); B60N 3/18 (2013.01); B60S 1/00 (2013.01)

(58) Field of Classification Search
CPC .. B60R 15/02; B60N 3/16; B60N 3/18; B60N 3/104; B60S 1/00
USPC ....... 280/830, 831, 832, 833, 834, 835, 836, 280/837, 839
See application file for complete search history.

(56) References Cited

U.S. PATENT DOCUMENTS

| | | | |
|---|---|---|---|
| 10,173,618 B2 * | 1/2019 | Pena Casimiro | ....... B60R 19/20 |
| 2020/0100464 A1 * | 4/2020 | Kim | ..................... A01K 13/001 |

FOREIGN PATENT DOCUMENTS

JP     H09118173 A  *  5/1997

OTHER PUBLICATIONS

Pentair Shurflo 5000 Series Diaphragm Pumps, SKU#: 5050-1311-D011 [online]. Pentair. Retrieved on Apr. 13, 2022, from https://www.pentair.com/en-us/products/business-industry/water-supply-pumps/spray-pumps/5000_series_diaphgram_pumps/sku/5050-1311-D011.html.
"Ecosmart POU 3.5 Point of Use Electric Tankless Water Heater, 3.5KW@120-Volt, 6 × 11 × 3 Inch" Amazon Listing [online]. Retrieved on Apr. 13, 2022, from https://www.amazon.com/Ecosmart-POU-3-5-Electric-Tankless/dp/B0047RAQZG/ref=sr_1_7?crid=2B5LMSK1TNS8L&keywords=ecosmart%2Bheater&qid=1648666735&sprefix=ecosmart%2Bheat%2Caps%2C259&sr=8-7&th=1.

* cited by examiner

Primary Examiner — Alentin Neacsu
Assistant Examiner — Felicia L. Brittman-Alabi
(74) Attorney, Agent, or Firm — Patterson + Sheridan, LLP

(57) ABSTRACT

Aspects herein are directed to a system that includes a storage tank, a mounting component, and a pump apparatus. The storage tank is configured to be placed within a volume of space between a false floor and an actual floor of a vehicle. The storage tank is further configured to store liquid. The system further includes a mounting component coupled to a first surface of the storage tank. The system also includes a pump apparatus coupled to a second surface of the mounting component. The pump apparatus is also configured to cause the liquid to be extracted from the storage tank and dispersed outside of the storage tank.

12 Claims, 9 Drawing Sheets

VEHICULAR LIQUID STORAGE SYSTEM

INTRODUCTION

Water storage systems store water and can be used for a variety of purposes. For example, various types of portable water storage systems are used for showering, cooking, rinsing equipment, washing pets, or hydration, among other purposes.

SUMMARY

Some embodiments are directed to a system that includes a vehicle, a storage tank, and a pump apparatus. The storage tank and pump apparatus may be configured to be placed within a particular space in the vehicle. Specifically, the vehicle can include a first volume of space and a second volume of space (e.g., which together form a frunk of a vehicle). The first volume of space may be partially defined by a false floor of the vehicle and the second volume of space may be below the first volume of space and below the false floor of the vehicle. The second volume of space may also be partially defined by the false floor and an actual floor of the vehicle. The system may further include a storage tank within the second volume of space or below the false floor. The storage tank may be configured to store liquid (e.g., water). The system may further include a pump apparatus (e.g., a water pump) within the second volume of space. The pump apparatus may be configured to cause the liquid to be extracted from the storage tank and dispersed outside of the storage tank.

Some embodiments are directed to a system that includes a storage tank, a mounting component, and a pump apparatus. The storage tank may be configured to be placed within a volume of space between a false floor and an actual floor of a vehicle. The storage tank may be further configured to store liquid. The system may further include a mounting component coupled to a first surface of the storage tank. The system may also include a pump apparatus coupled to a second surface of the mounting component. The pump apparatus may be configured to cause the liquid to be extracted from the storage tank and dispersed outside of the storage tank.

Some embodiments are directed to a system that includes a storage tank that includes a plurality of dividers (or baffles), a pump apparatus, and a pressure component (e.g., a diaphragm or impeller). The storage tank may be configured to be placed within a volume of space between a first surface and a second surface of a vehicle. The first surface and the second surface may be within an interior section of the vehicle. The interior section may be at least partially defined by a floor of the vehicle and a roof of the vehicle. The storage tank may be further configured to store liquid. The system may further include a plurality of dividers defining different sections within the storage tank. The plurality of dividers may be configured to prevent sloshing of the liquid. The system may further include a pump apparatus configured to cause the liquid to be extracted from the storage tank and dispersed outside of the storage tank. The system may further include a pressure component within the pump apparatus. The pressure component may be configured to cause the liquid to be pressurized for the dispersion of the liquid outside of the storage tank.

DESCRIPTION OF THE DRAWINGS

Examples of aspects herein are described in detail below with reference to the attached drawings figures, wherein.

DETAILED DESCRIPTION

Figure 1:
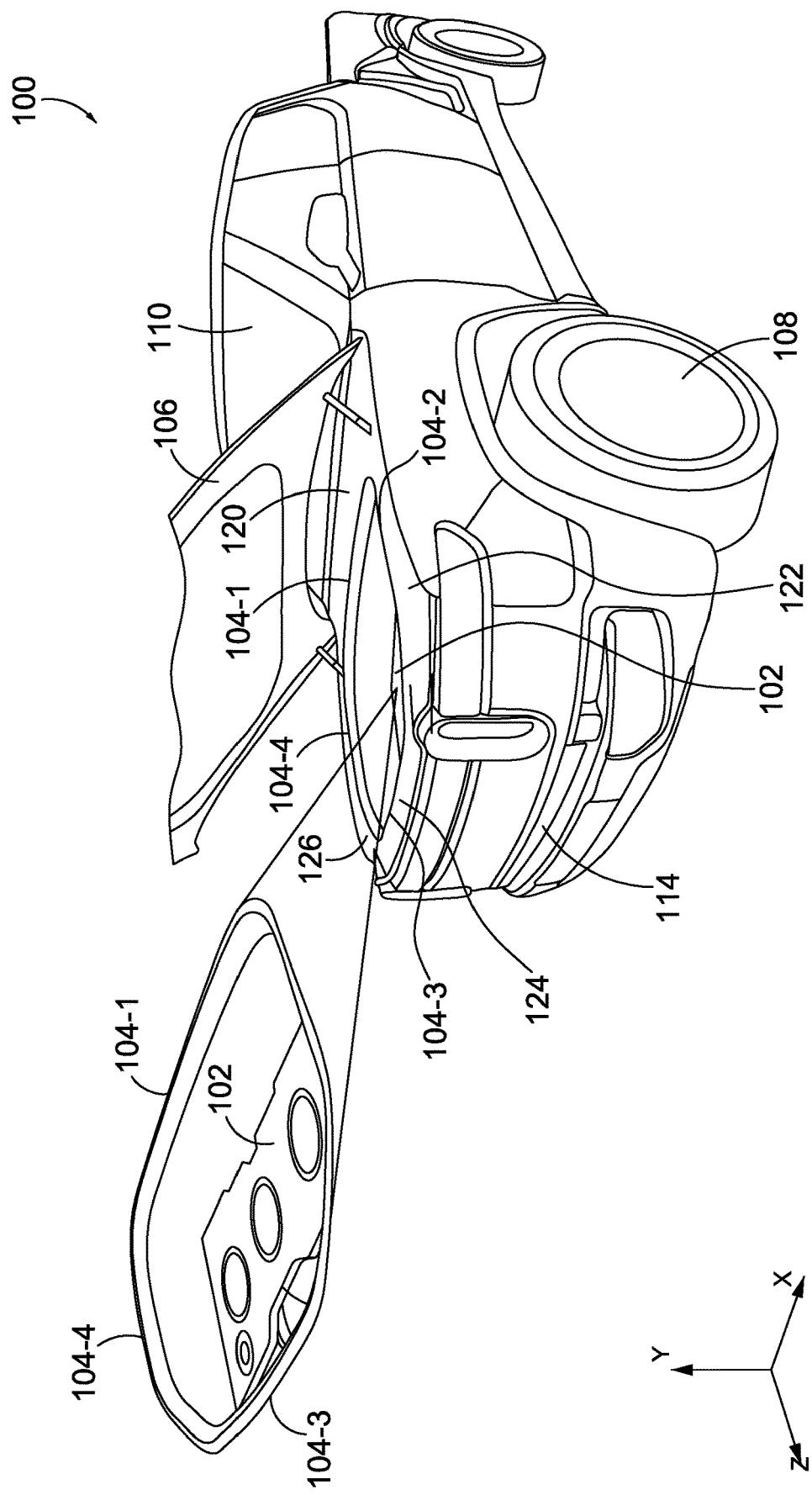
FIG. 1 illustrates a frontal side perspective view of an example vehicle where the frunk of the vehicle includes a liquid storage system, according to some embodiments.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

At a high level, certain embodiments described herein relate to a vehicular liquid storage system that includes a storage tank configured to be placed (or specially designed to fit) within a volume of space between a false floor and an actual floor of a vehicle. Such placement or design of the storage tank allows the entire volume of space above the false floor to be used for storing items (e.g., groceries) while also maximizing the amount of liquid stored in the storage tank. The liquid storage system further eliminates or reduces user burden of having to manually install or build components. For instance, various embodiments of the storage tank are custom molded to have a friction-based fit with corresponding contours of an interior surface of a vehicle. Accordingly, users do not have to install fasteners to fasten the storage tank to the vehicle to reduce movement. Moreover, such placement allows the water mass to remain low and avoids raising the vehicle's center of gravity since the storage tank is in a more central location when it is underneath the false floor relative to being above the false floor.

In an illustrative example, a vehicle "frunk" (i.e., a front-loading trunk or storage space) may contain a volume of space defined by a false floor or platform at the bottom of the frunk. The storage tank can be custom molded to fit an actual floor surface underneath such false floor, which maximizes the amount (e.g., 10 to 15 gallons) of water storage because its housing uniquely conforms to the contours of the vehicle space beneath the false floor. In this way, the entire (or substantial amount of) volume of space above the false floor of the frunk can be utilized and yet the water storage is maximized. This is different than water storage system solutions that are configured to either be placed on the outside of the vehicle (making the vehicle less aesthetically pleasing), take up unnecessary usable space in a vehicle (e.g., a trunk), or are not custom built to fit within the vehicle (e.g., they come in one universal size), thereby causing water storage tank sliding, water spillage, or a reduction in the amount of water storage space, among other things.

In some embodiments, the liquid storage system includes a pump apparatus. The pump apparatus is configured to cause liquid to be extracted from the storage tank of the system and dispersed (e.g., via a pressure component) outside of the storage tank so as to, for example, wash dishes, spray off shoes, cooking, or the like. Other solutions fail to include a pump apparatus, such as an electronic pump, that is built-in to a water storage tank.

In some embodiments, the storage tank of the liquid storage system includes multiple dividers or baffles that define different sections within the storage tank. In some embodiments, such dividers are configured to prevent or reduce the sloshing of liquid so as to prevent or reduce unnecessary noise or even liquid leakage when storage tank caps are not securely fastened.

In some embodiments, the storage tank of the liquid storage system additionally or alternatively includes different types of caps and corresponding apertures, unlike existing solutions. For example, the storage tank may include multiple marine-style (also referred to as "deck-style") apertures and corresponding caps that are sufficiently large in diameter so that users can easily fit a hand or arm within the apertures so that the users can easily clean the storage tank. Additionally (or alternatively), the storage tank can include one or more other apertures and corresponding caps so that users can easily fill up (e.g., via a hose) and/or extract liquid from the storage tank.

In some embodiments, the storage tank of the liquid storage system additionally or alternatively includes one or more handles so that users can use their hands to easily install, place, and/or remove the storage tank to or from its storage location. In this way, the storage tank can be easy transported or otherwise moved.

In some embodiments, the storage tank of the liquid storage system additionally or alternatively includes a reservoir (and corresponding tubing) at a bottom surface (e.g., the surface abutting or next to an actual trunk floor) such that liquid suction for the pump apparatus to pump liquid can easily function until the liquid is substantially depleted from the storage tank. As water is extracted from a storage tank, gravity keeps the water towards the bottom portion of the storage tank. However, the bottom surface of some storage containers are substantially planar or flat. This means that if there is only a little water left in the storage tank, the water may be evenly distributed along the flat surface, thereby causing suction problems with the water since there may not be enough water to extract. However, the reservoir at the bottom of the storage tank described herein causes the remaining portion of the liquid (or a substantial portion of liquid) to fill the reservoir via gravity, thereby allowing for greater suction and therefore water pressurization and dispersion.

In some embodiments, the liquid storage system additionally or alternatively includes a heating component that is configured to heat the liquid in order to, for example, take a warm shower or consume a warm drink. For instance, the heating component can include a heating rod within the storage tank that is configured to produce heat transfer to the stored liquid. In another example, the liquid storage system can include an inline electric heater coupled to a tubing and pump apparatus to heat the liquid, as described in more detail below.

In some embodiments, the liquid storage system additionally or alternatively includes a filtering component that is configured to filter or purify the liquid in order to hydrate, wash dishes, or otherwise use filtered water when appropriate. For instance, the filtering component can include a passive filter (carbon, paper, or mesh) and potentially a UV filter to allow the consumer filter water as it is pumped from the storage tank.

Turning now to FIG. 1, illustrating a frontal side perspective view of an example vehicle 100, where the frunk 104 includes a liquid storage system 102, according to some embodiments. FIG. 1 illustrates that in some embodiments, the liquid storage system 102 can be located in or specially designed to fit in a frunk 104 of the vehicle 100. Although the vehicle 100 is illustrated as a specific RIVIAN R1T electric truck, it is understood that the vehicle 100 can alternatively be any suitable make, model, or type, such as a gas-powered (internal combustion engine) van, truck, SUV, or a hybrid electric/gas-powered vehicle. The vehicle 100 is an electric vehicle, thereby allowing the frunk 104 to be located under the hood 106, which space would typically be made to house an internal combustion engine and other components of a gas-powered vehicle. However, electric vehicles, such as the vehicle 100, have no engines but rather include one or more electric motors, thereby allowing the frunk 104 to exist and store other items, such as luggage, camping gear, groceries, or the like. In some embodiments, the vehicle 100 includes one or more motors (not shown), such as a 147-kW all-electric motor, mounted at each wheel (e.g., behind wheel 108), and powered by a particular battery (e.g., 105, 135, or 180 KWhs). This allows storage space, such as the frunk 104, to exist at a front portion of the vehicle, as illustrated in FIG. 1.

As illustrated in FIG. 1, the frunk 104 is a volume of space that is defined by X, Y, and Z plane surfaces of the vehicle 100. That is, the frunk 104 is defined by its depth (from the perspective of a user looking into the funk 104), its length, and height, which is described in more detail below. The upper surface of the frunk 104 (the portion that abuts or is closest to the hood 106 when it is closed) is defined by its four edges-104-1, 104-2, 104-3, and 104-4. The frunk 104 is further defined by or abuts against specific portions of the vehicle 100. For example, the upper edge 104-1 is defined by an upper frontal surface 120 of the vehicle 100, which abuts against or is coupled to the windshield 110. The side edges 104-4 and 104-2 are defined by the side surfaces 126 and 122 respectively of the vehicle 100. The bottom edge 104-3 is defined by the bottom surface 124 of the vehicle, which abuts against or is coupled to the bumper panel 114, which is perpendicular to the surface 124.

Figure 2:
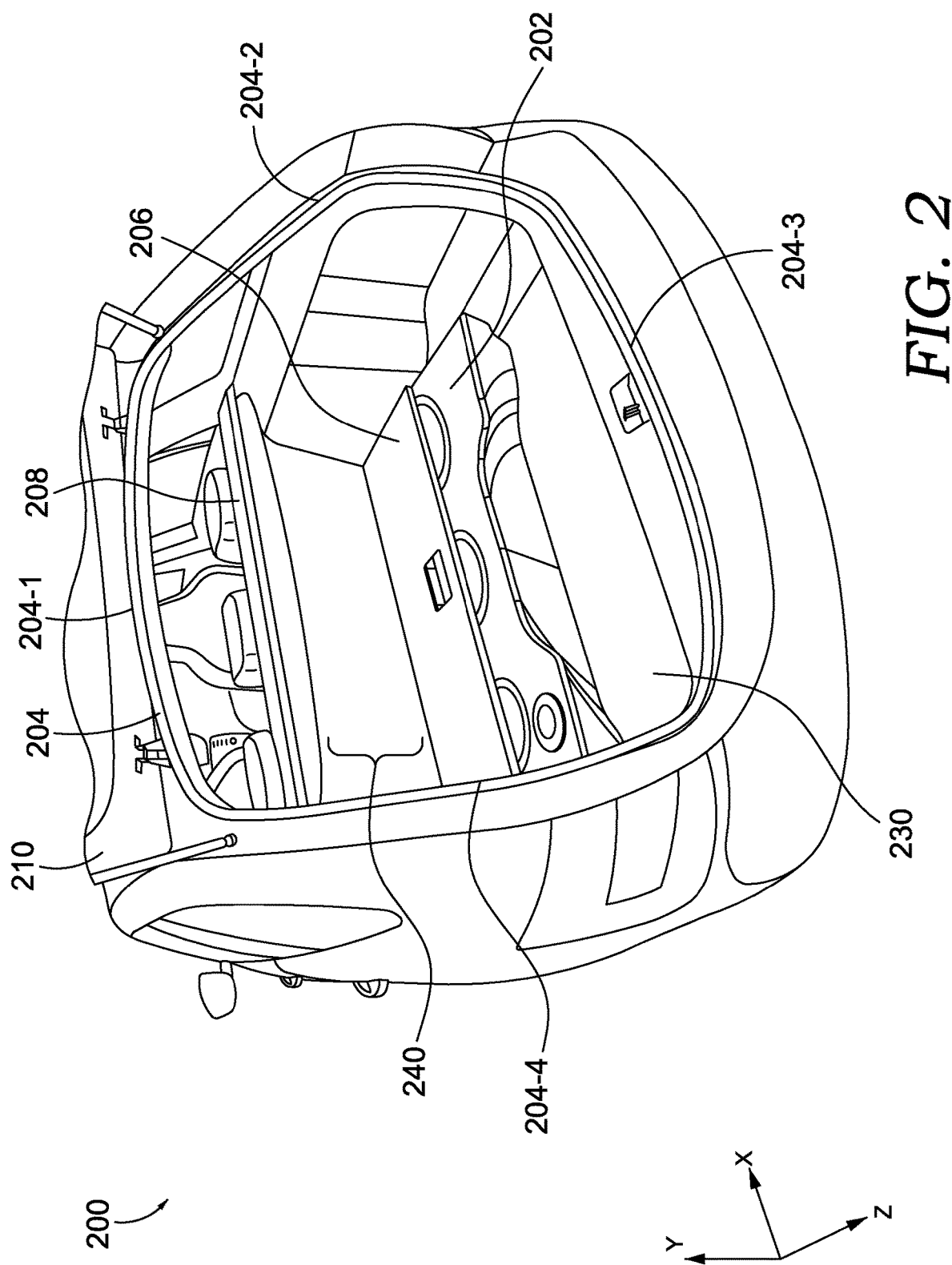
FIG. 2 illustrates a rear view of an example trunk of a vehicle that includes a liquid storage system, according to some embodiments.

Turning now to FIG. 2, which illustrates a rear view of an example trunk 204 of a vehicle 200 that includes a liquid storage system 202, according to some embodiments. FIG. 2 illustrates that in some embodiments, the liquid storage system 202 can be located in or specially designed to fit underneath a false floor 206 of a trunk 204, which is a rear storage space of the vehicle 200. As described above, although the vehicle 200 is illustrated as a specific make, model, or type, it is understood that the vehicle 200 can alternatively be any suitable make, model, or type, such as an electric vehicle, a gas-powered (internal combustion engine) vehicle, and/or a hybrid vehicle that is a truck, SUV, van, or car.

As illustrated in FIG. 2, the trunk 204 is a volume of space that is defined by X, Y, and Z plane surfaces of the vehicle 200. That is, the trunk 204 is defined by its depth (or Z-plane) (from the perspective of a user looking into the trunk 204), its length (X-plane), and height (Y-plane). For example, the trunk 204 can be defined by the back row of seats 208 in a depth plane. The trunk 204 can further be defined by: the upper edge 204-1, which extends in a depth plane, as a ceiling (not shown), up until the back row of seats 208, the two side edges 204-2 and 204-4, which also extend in a depth plane toward the back row of seats 208, and the bottom edge 204-3, which partially forms the actual floor 220 that extends in a depth plane toward the back row of seats 208. In some embodiments, the trunk 204 is defined by the hatch door 210, when the hatch door 210 is closed against the edges 204-1, 204-2, 204-3, and 204-4 (as opposed to being open, as currently illustrated).

As illustrated in FIG. 2, the liquid storage system 202 is situated in or otherwise conforms to a volume of space 230, which is underneath and partially defined by both the false floor 206 and the actual floor 220. The volume of space 240, which is at least partially defined by the false floor 206, the back row of seats 208, the top edge 204-1 (or ceiling) and the side edges 204-2 and 204-4, is above the volume of space 230 and is configured to host other items, such as groceries or other items such that the liquid storage system 202 will not occupy item storage space or otherwise be in the way.

It is understood that although both FIG. 1 and FIG. 2 illustrate that the liquid storage system 302 is placed either in a frunk or trunk of a vehicle, the liquid storage system 302 can be built to be placed in any suitable location within a vehicle. Specifically, the liquid storage system 302 can be configured to be placed within a volume of space between any first surface and a second surface of a vehicle, where the first surface and the second surface are within an interior section of the vehicle, the interior section being at least partially defined by a floor (e.g., an actual or false floor) of the vehicle and a roof of the vehicle. For example, the first surface may be a seat surface and the second surface may be an actual floor surface of a vehicle, such that the liquid storage system 302 can be built to fit underneath an area where a passenger is sitting. In another example, the first and second surfaces can define a volume of space within a glove compartment, such that the liquid storage system 302 fits within the glove compartment.

Figure 3:
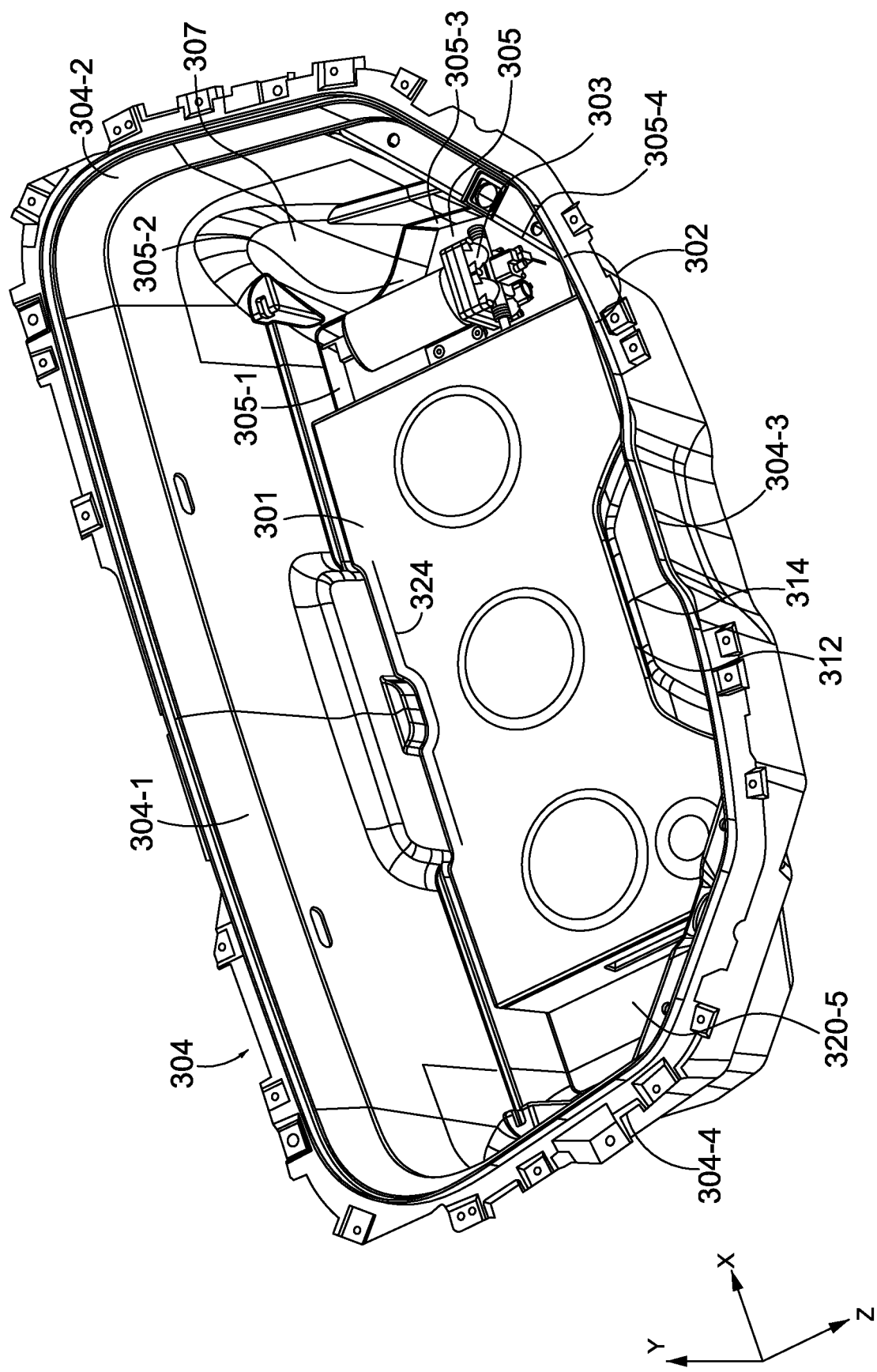
FIG. 3 illustrates a top perspective view of a volume of space that includes a liquid storage system, according to some embodiments.

FIG. 3 illustrates a top perspective view of a volume of space 304 that includes a liquid storage system 302, according to some embodiments. FIG. 3 represents what a user would see when looking into the volume of space 304 from a Z-plane perspective. In some embodiments, the volume of space 304 represents the frunk 104 of FIG. 1 or some other volume of space, such as the volume of space between the false floor 206 and the true floor 220 of FIG. 2. For example, the back wall 304-1 may represent or be a part of the top edge 104-1 of FIG. 1, the side wall 304-2 may represent or be a part of the side edge 104-2 of FIG. 1, the bottom wall 304-3 may represent or be a part of the bottom edge 104-3 of FIG. 1, and the side wall 304-4 may represent or be a part of the side wall 104-4 of FIG. 1.

FIG. 3 illustrates how the liquid storage system 302 (which includes the storage tank 301, the mounting component 305, and the pump apparatus 305) is custom molded to fit, abut, or otherwise conform to surfaces of the volume of space 304. Specifically, for example, the top edge 324 of the storage tank 301 contains cutouts and grooves that fit corresponding surfaces of the back wall 304-1 as illustrated in FIG. 3. Likewise, the bottom edge 312 of the storage tank 301 is molded to fit, abut, or otherwise conform to the interior surface 314 of the volume of space 304. Likewise, the top edge 305-1 of the mounting component 305 is molded to fit, abut or otherwise conform to a surface of the back wall 304-1. The rounded edge 305-2 of the mounting component 305 is molded to fit, abut, or otherwise confirm to the well surface 307 of the side wall 304-2, and the side surfaces 305-3 and 305-4 are additionally molded to fit, abut, or otherwise conform to the surfaces of the side wall 304-2 or bottom wall 304-3, as illustrated in FIG. 3.

The liquid storage system 302 (and the components thereof) may be manufactured to conform to surfaces of the volume of space 304 via any suitable techniques, such as using a saw blade to perform corresponding cutouts at the edges of the mounting component 305 or via molding (e.g., injection molding or rotational molding) of the casting material that makes up the storage tank 311, where the mold conforms to the surfaces of the volume of space 304. In this way, the liquid storage system 302 will not (or is less likely to) slide, flip over, or otherwise be displaced out of its current position regardless of the terrain the vehicle traverses. It is understood that although the liquid storage system 302 is illustrated as being custom built or molded, in some embodiments, the liquid storage system 302 is not custom build or molded but can take on any universal shape or be made out of any suitable flexible polymer, such as polyethylene, ethylene vinyl acetate, or the like. In this way, the liquid storage system can be universally made to be placed or fit within any interior space.

Figure 4:
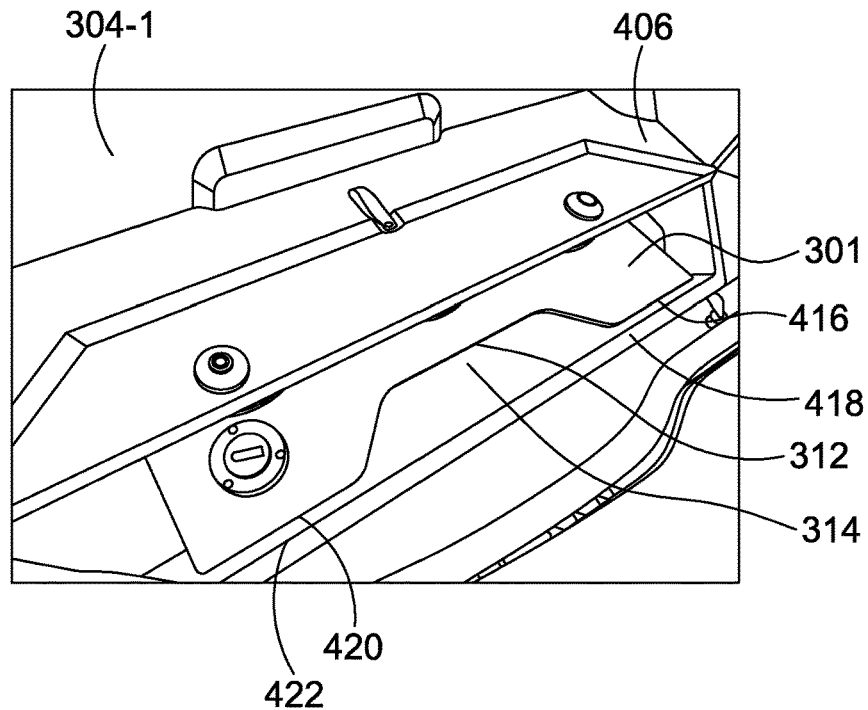
FIG. 4 illustrates a top view of the liquid storage system of FIG. 3 in relation to a false floor, according to some embodiments.

FIG. 4 illustrates a top view of the liquid storage system 302 of FIG. 3 in relation to a false floor 406, according to some embodiments. In some embodiments, FIG. 4 represents a more close up view of the liquid storage system 302 relative to FIG. 3, except that the false floor 406 is covering up a portion of the liquid storage system 302. With respect to FIG. 3, in some embodiments, the volume of space 304 is illustrated without a false floor or the false floor 406 is completely retracted so that it is not visible in FIG. 3.

Although the false floor 406 is presently illustrated as partially covering the liquid storage system 302, the false floor 406 is configured to extend across (or fold) over the entirety of the liquid storage system 302 such that the surface (e.g., that defines the false floor 406 of a frunk or trunk) is substantially flush or flat and such that the liquid storage system 302 is not visible or otherwise accessible to a user. In this way, the volume of space above the false floor 406 can be used for the storage of other items with ease. When the user wishes to access the liquid storage system 302, the user can move, retract, or fold back the false floor 406, as illustrated by FIG. 3 or FIG. 4. Such that the entire liquid storage system 302 is viewable and accessible.

FIG. 4 further illustrates that the liquid storage system 302 is custom molded, such that it fits the contours of vehicle surfaces beneath the false floor 406. Specifically, the two bottom surfaces 420 and 416 of the storage tank 301 abut against or otherwise fit to the corresponding winged surfaces 422 and 418 of the front wall 304-3. Such fit is also possible because the storage tank 301 also includes an elevated edge 312 (extending higher in a Y plane than the edges 420 and 416) that abuts against or otherwise fits against the slot surface 314 of the vehicle.

Figure 5:
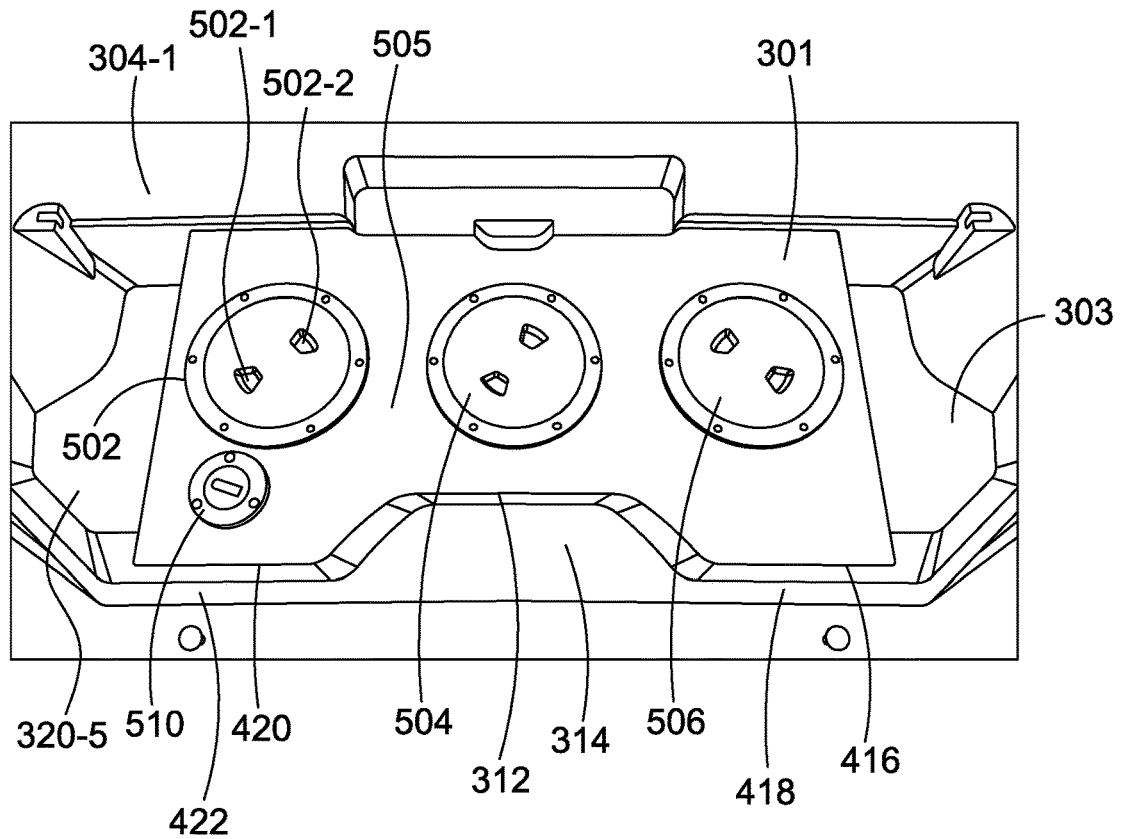
FIG. 5 is a top view of the liquid storage system of FIG. 3, according to some embodiments.

FIG. 5 is a top view of the liquid storage system 302 of FIG. 3, according to some embodiments. FIG. 5 specifically illustrates the type of caps that can be included in the storage tank 311. The storage tank 301 includes the marine caps 502, 504 and 506. The marine caps (also referred to as "deck" caps) 502, 504, and 506 define respective surfaces of the face 505 and abut against or are otherwise removably secured to edges defining corresponding apertures (described in FIG. 7) so that users can remove the marine caps and place their arms/hands or inspect inside the storage tank 301. For example, in some embodiments, the marine-style caps are removable via threading that defines the apertures of the storage tank 301 such that radial rotation (e.g., counter-clockwise rotation) of the caps cause a removal of the caps. In other embodiments, the marine caps "pop" off or are otherwise displaced via an actuating mechanism. For example, the grooves 502-1 and 502-2 may include an actuating mechanism (not shown) that is configured to receive pressure above a threshold (via fingers pressing in a pinching motion towards each other), and once the threshold is exceeded, the actuating mechanism may unlock and the corresponding marine cap 502 is displaced from the face 505.

The storage tank 301 further includes a liquid fill cap 510. As illustrated in FIG. 5, the liquid fill cap 510 is smaller in diameter relative to the marine caps 502, 504, and 506. This is because the liquid fill cap 510 is not configured to receive human extremities for cleaning or otherwise inspecting the storage tank 311 like the marine caps are, but is rather configured to receive a hose or other channel so that liquid can enter the storage tank 301 via an aperture underneath the liquid fill cap 510. The liquid fill cap 510 also defines a respective surface of the face 505 and abuts against or is otherwise removably secured to edges defining corresponding apertures (as described with respect to FIG. 7) so that users can fill the storage tank 301 with liquid. In some embodiments, the liquid fill cap 510 is removable via threading that defines an aperture of the storage tank 301 such that radial rotation (e.g., counter-clockwise rotation) of the liquid fill cap 510 causes a removal of the liquid fill cap 510. In some embodiments, the liquid fill cap 510 includes a tether (not shown) coupled to the liquid storage cap 510 at a first end and attached or otherwise secured to the face 505 (or corresponding aperture) at a second end. In this way, the liquid fill cap 510 does not get lost or otherwise displaced, especially because it is small.

Figure 6:
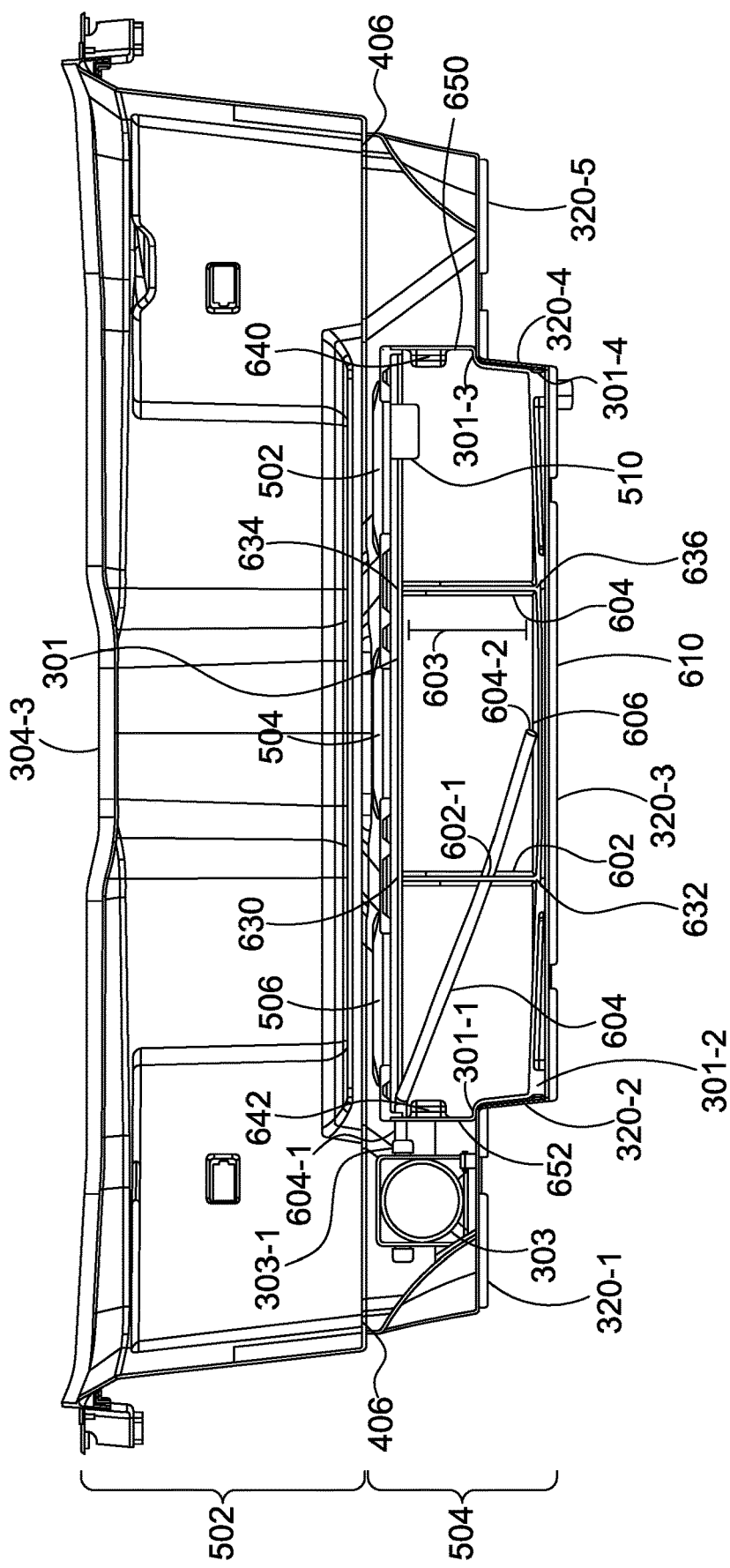
FIG. 6 illustrates a rear cross-sectional view of the volume of space of FIG. 3, according to some embodiments.

FIG. 6 illustrates a rear cross-sectional view of the volume of space 304 of FIG. 3, according to some embodiments. Numeral 502 represents the volume of space (a sub-space of 304) above and partially defined by the false floor 406. Such volume of space 502 represents the space that users can utilize to store items, such as groceries, camping gear, or other items. Volume of space 504 (another sub-space of 304) represents a second volume of space beneath the volume of space 502, and represents space that is used to store the liquid storage system 302. As illustrated within the volume of space 504, the storage tank 301 is uniquely designed to fit within the actual floor 320 (which is defined by 320-1, 320-2, 320-3, 320-4, and 320-5 in FIG. 6) of the vehicle. For instance, the storage tank 301 includes a lip 301-1 that hangs over a corresponding edge 320-1 of the actual floor 320. Further, the bottom corner 301-2 of the storage tank 301 conforms to the corresponding edges 320-2 and 320-3 of the actual floor 320. Likewise, the storage tank 301 includes a second lip 301-3 that hangs over a corresponding edge 320-5 and the second bottom corner 301-4 conforms to the corresponding edges 320-4 and 320-3. As described above, such custom fit or molding prevents or decreases the movement of the liquid storage system 302 such that it does not flip over, slide, or otherwise be displaced.

FIG. 6 further illustrates the different components within the storage tank 301. The storage tank 301 includes a volume of space 603, which is configured to hold or store liquid, such as water. The storage tank 301 includes dividers (or baffles) 602 and 604 within the volume of space 603. As illustrated, the divider 602 longitudinally extends (in a Y-plane) from an inner top surface 630 of the storage tank 301 to an inner bottom surface 632 of the storage tank 301 and the divider 604 longitudinally extends from the inner top surface 634 of the storage tank 301 to an inner bottom surface 636 of the storage tank 301. The dividers 602 and 604 have utility so as to prevent the sloshing of liquid, such as when a driver drives a vehicle. The dividers 602 further divide the volume of space 603 into three different sections. The divider 602 also has utility in supporting the tubing 604 to ensure that the tubing extends to the reservoir 606, which is described in more detail below.

Figure 7:
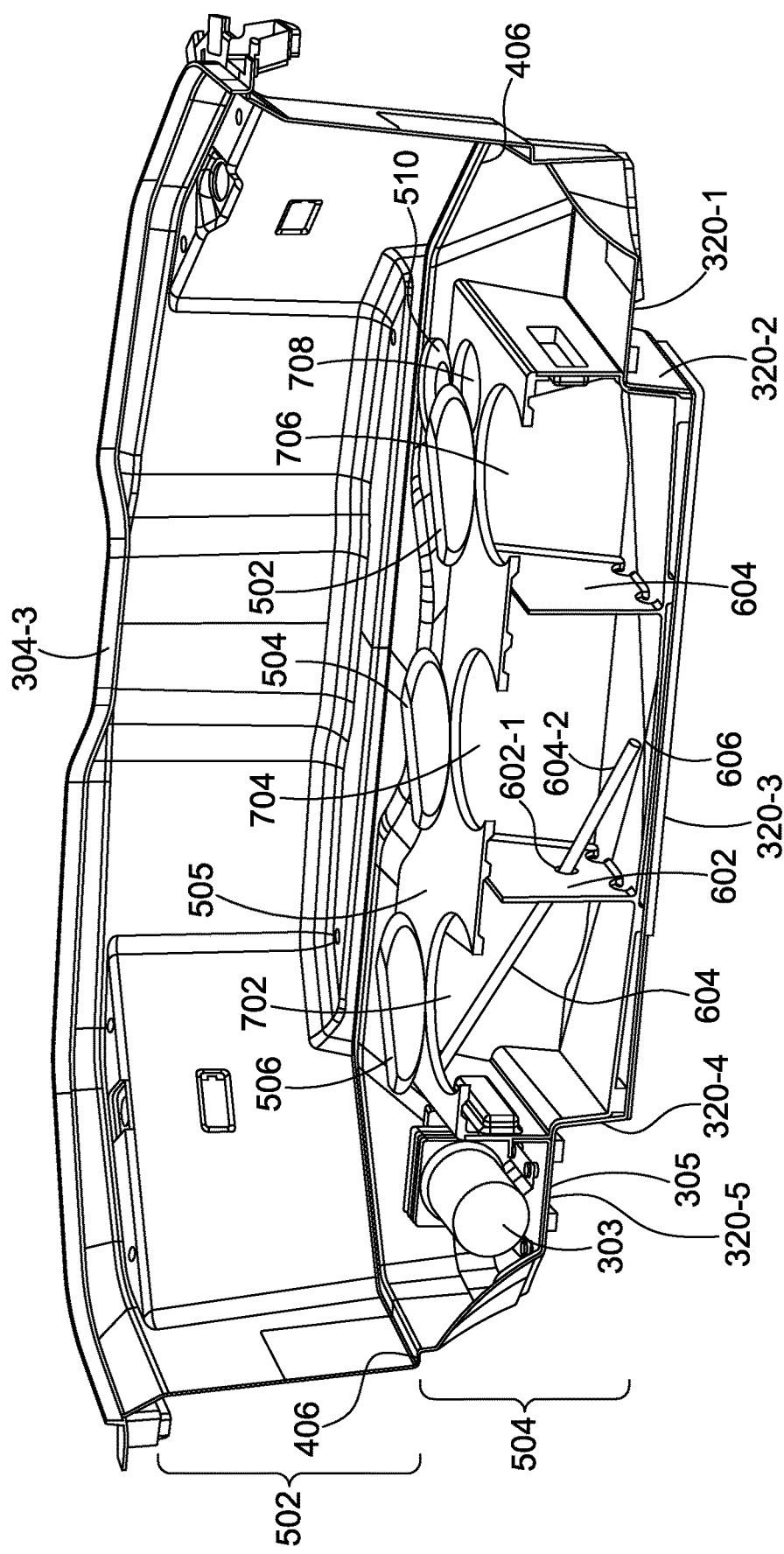
FIG. 7 illustrates an upper perspective cross sectional view of the volume of space of FIG. 3, with the marine caps and liquid fill cap open, according to some embodiments.

The pump apparatus 305 includes a port 305-1, which is connected to a first end 604-1 of the tubing 604. The tubing 604 laterally extends (in a X-plane) through another port or aperture (not shown) at the storage tank 301 in order to enter the volume of space 603 of the storage tank 301. The tubing 604 further extends through the aperture 602-1 of the divider 602 and the second end 604-2 is situated at or substantially near the reservoir 606. In this way, liquid can be extracted from the volume of space 603 via the pump apparatus 303 and corresponding tubing 604. Accordingly, liquid can travel from the end 604-2 near the reservoir 606 to the first end 604-1, to the port 305-1, and into the pump apparatus 303 such that the pump apparatus 303 causes the liquid to be dispersed outside of the storage tank 301 (e.g., in order to wash dishes). The reservoir 606 is a pool, groove, cavity, or other surface that is lower than any surface of the bottom of the storage tank 301. In this way, as more liquid is extracted from the storage tank 301, the more the liquid will be concentrated at the reservoir 606. This provides a longer lasting suctioning and extraction capability so that liquid can be extracted in greater amounts and for a longer period of time. As illustrated in FIG. 6 and FIG. 7, the reservoir 606 is located at a bottom surface of the storage tank 301, and the reservoir 606 is defined by a portion of the storage tank 301 that is raised higher relative to any other portion at the bottom surface.

Continuing with FIG. 6, the storage tank 301 includes a first handle 640 and a second handle 642. Specifically, the first handle 640 is located at a first side surface 650 of a first side of the storage tank 301. And the second handle 642 is located at a second side surface 652 of a second side of the storage tank 301. As illustrated, the handles 640 and 642 are cutouts or grooves that indent inward toward the volume of space 603 in a X-plane such that a user can place their fingers within the cutouts or grooves to either displace the storage tank 301 from its location in the volume of space 304 or insert the storage tank 301 into its location in the volume of space 304.

FIG. 7 illustrates an upper perspective cross sectional view of the volume of space 304 of FIG. 3, with the marine caps and liquid fill cap open, according to some embodiments. As illustrated in FIG. 7, the apertures 702, 704, and 706 are cutouts that define edges of the face 505 of the storage tank 301. The marine cap 506 is configured to be secured (e.g., tightened) and unsecured (e.g., loosened) over the edges of the face 505 that define the aperture 702. Likewise, the marine cap 505 is configured to be secured and unsecured over the edges of the face 505 that define aperture 704. And the marine cap 502 is configured to be secured and unsecured over the edges of the face 505 that define aperture 706. FIG. 7 further illustrates the aperture 708, which is another cutout that defines edges of the face 505 of the storage tank 301. The liquid fill cap 510 is configured to be secured and unsecured over the edges of the faces 505 that define the aperture 708. The apertures 702, 704, and 706 are configured to receive a human extremity (e.g., a hand and/or arm) or object extended therefrom (e.g., a rod or paper towel) to clean a respective portion of the storage tank 301. For example, the aperture 704 may receive an arm and a user may clean the reservoir 606 via the aperture 704. Such "portion" of the storage tank may refer a section of the storage tank, as defined by the dividers 602 and 604. The aperture 708 is configured to receive liquid to fill the volume of space 603 of the liquid storage tank 301. For example, the aperture 708 may receive a hose and a user may turn on a water source in order to fill the volume of space 603.

Figure 8:
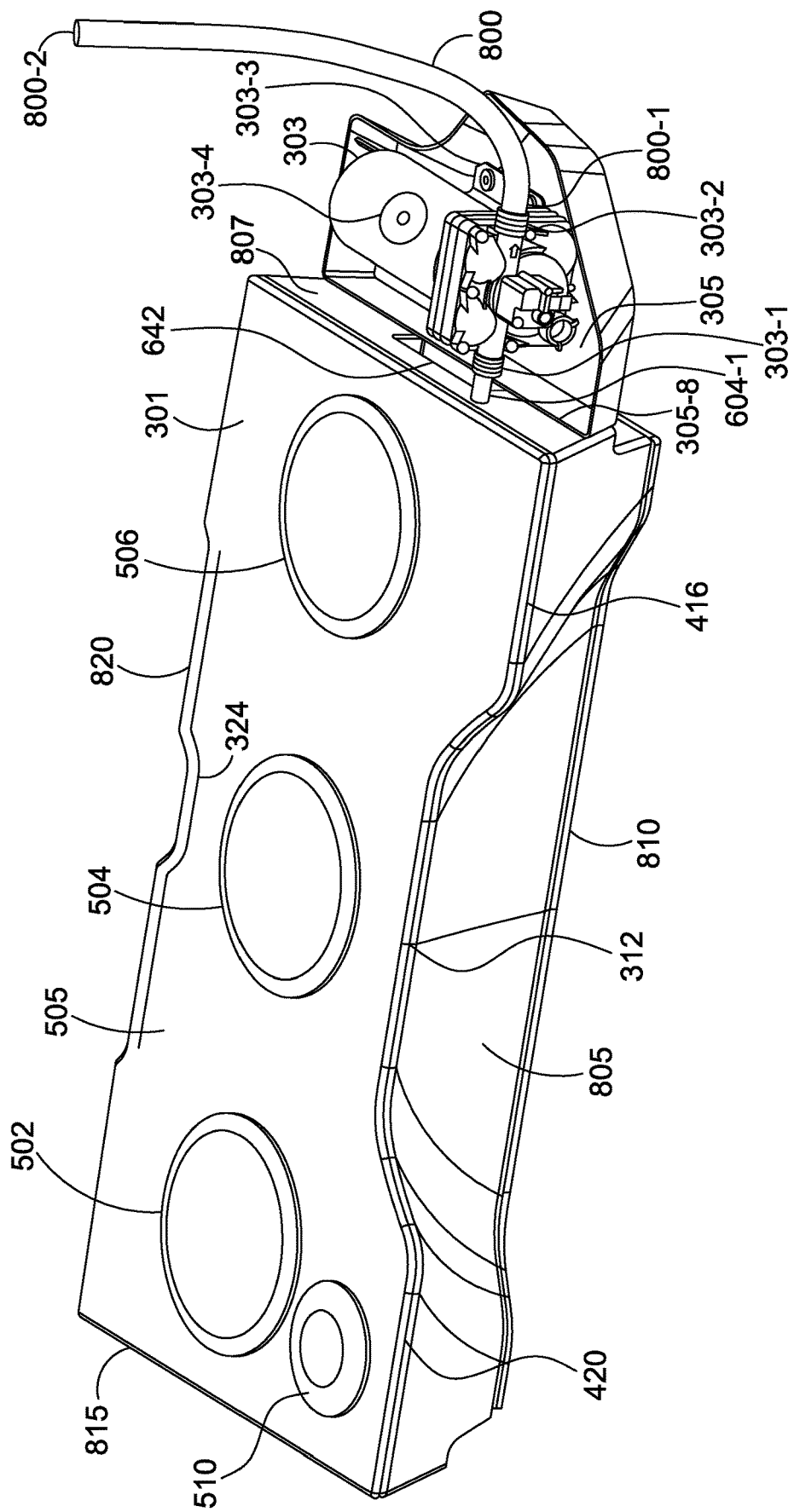
FIG. 8 illustrates a top perspective view of the liquid storage system of FIG. 3, with an additional tubing for dispersion of liquid, according to some embodiments.

FIG. 8 is a top perspective view of the liquid storage system 302 of FIG. 3, with an additional tubing 800 for dispersion of liquid, according to some embodiments. FIG. 8 illustrates that the liquid storage system 302 is removable from the volume of space 304. In this way, users can move the liquid storage system 302 to any suitable environment for any suitable purpose. For example, users can place the liquid storage system 302: in a grass area to wash a pet, in a kitchen area to wash dishes, or any area outside of the vehicle 100/200 to wash the vehicle 100/200. However, in some embodiments, the liquid storage system 302 is built-in, removably secured to, or otherwise coupled to the actual floor 320. For example, in some embodiments, the liquid storage system is fastened to the actual floor 320 via adhesive, screws, a hook & loop fasteners, or a friction fit within the corresponding space or grooves indicated via 320 of FIG. 6.

In an illustrative example of coupling, the bottom surface 810 of the storage tank 301 can include one or more banks of adhesive loop material and the actual floor 320 can contain one or more corresponding banks of adhesive hook material. In this way, when the bottom surface 810 is placed within the slot defining the actual floor 320, the loop banks fasten to the hook banks (thereby acting as a hook and loop fastener) to removably secure the storage tank 311 to the actual floor 320. In another example, and as described above, there may be a friction fit coupling based on the edges 420, 416, 324, 312 and the front side wall 805 being custom molded to fit or abut against corresponding surfaces (e.g., 304-1, 307, 314, 320) within the volume of space 304.

FIG. 8 further illustrates the extra tubing 800 (e.g., a hose), which is used for liquid dispersion. The first port 303-1 of the pump apparatus 303 is connected to the first end 604-1 of the first tubing 604. The second port 303-2 of the pump apparatus 303 is connected to the first end 800-1 of the second tubing 800. In this way, the liquid within the volume of space 603 (see FIG. 6) is configured to be dispersed by being extracted from the storage tank 301 (e.g., at or substantially near the reservoir 606), and traverses from the first tubing 604, to the pressure component 303-4 of the pump apparatus 303, then to the second port 303-2 of the pump apparatus 303, then to the first end 800-1 of the second tubing 800, and is then dispersed out of the second end 800-2 of the second tubing 800, which is outside of the volume of space 603 of the storage tank 301. In some embodiments, the second end 800-2 of the second tubing 800 is connected to another suitable component (not shown) for dispersion, such as a slot of a hose nozzle or sprayer for dispersion, a portable showerhead for taking showers, or the like.

The pump apparatus 303 can be any suitable pump apparatus. For example, in some embodiments, the pump apparatus 303 represents an automated diaphragm pump (also referred to as a "membrane pump"), such as a SHUR-FLO 5000 series pump (e.g., SKU #: 5050-1311-D011). A diaphragm pump uses a combination of reciprocating action of a diaphragm (e.g., a rubber, thermoplastic, or PTFE piece) and suitable valves (e.g., check valve, butterfly values, flap values or any shut-off valve) on either side of the body to pump liquid. Specifically, when the volume of a chamber within the pump 303 is increased due to the diaphragm moving up, decompressing, or opening, the pressure decreases, and liquid is drawn in to the chamber. When the chamber pressure increases from decreased volume due to the diaphragm moving down, compressing, or closing, the fluid previously drawn in is forced out at a particular pressure level that exceeds the pressure level of the fluid in its stand-still position within the storage tank 301. The diaphragm moving up once again draws fluid into the chamber, completing the cycle.

In some embodiments, the pump apparatus 303 alternatively represents any other suitable type of pump, such as a booster pump, a centrifugal pump, ANSI process pump, a an API process pump, an axial flow pump, a canned motor pump, a chopper pump, a hand pump, or any other type of pump that can cause the liquid to be extracted from the storage tank 301 and dispersed outside of the storage tank 301.

The pump apparatus 303 includes a pressure component 303-4 (located within a housing of the pump apparatus 303). The pressure component 303-4 is any suitable component that is responsible for or otherwise contributes to causing liquid to be pressurized during the dispersion of the liquid. For example, the pressure component 303-4 can be a diaphragm or shut-off valve within a diaphragm pump, an impeller of a booster pump, a motor or rotor of a canned motor pump, a seal of a cryogenic pump, an ejector of a jet pump, a magnet of a magnetic drive pump, or the like. In some embodiments, the pump apparatus 303 is switch-activated, meaning that when a switch closes or a button is pushed, the pressure component 303-4 responsively and automatically performs its functionality.

Because the pump apparatus 303 includes the pressure component 303-4, this is different than existing solutions where the pressurization of the water occurs via the water storage tank being pressurized. However, pressurizing the storage tank 301 may be dangerous with the potential for explosion and projecting components within the storage tank 301, thereby potentially causing injury. Accordingly, various embodiments include the pressure component 303-4 within the pump apparatus without pressurizing the storage tank 301.

In some embodiments, the pump apparatus 303 runs off a vehicle's (e.g., vehicle 100 or 200) electricity (as opposed to requiring a separate auxiliary battery). Most pump solutions for combustion engine cars have a pump that needs to run off a car main or auxiliary battery. However, this increases the risk of draining the battery fairly quickly. In electric car solutions, however, the pump apparatus 303 can include a cable (not shown) that is connected, at a first end, to a terminal on a battery (e.g., behind the wheel 108 of FIG. 1), which is responsible for partially powering the vehicle, but other batteries, such as behind the other wheels, may be free to power the vehicle.

Continuing with FIG. 8, FIG. 8 also illustrates how the components of the liquid storage system 302—the storage tank 311, the mounting component 305, and the pump apparatus 303—are coupled to each other as a single unit. As illustrated in FIG. 8, the side surface 305-8 of the mounting component 305 is coupled (e.g., via screws) to the side surface 807 of the storage tank 301, just below the handle 642. The pump apparatus 303 is also mounted to the mounting component 305 via screws fastening through the aperture 303-3 of the pump apparatus 303 (though they may be removably secured via other means, such as hook and loop fastener, adhesive, or the like). It is understood, however, that even though FIG. 8 illustrates that these components are coupled together, in some embodiments, one or more of these components are de-coupled or otherwise exist or are sold separately. For example, the liquid storage system 302 need not include or otherwise be coupled to the mounting component 305 or the pump apparatus 303. The mounting component 305 may be any suitable substantially planar component, such as a tray or other platform that is configured to couple the pump apparatus 303 to the storage tank 301.

FIG. 8 further illustrates the three-dimensional nature of the storage tank 301. As illustrated in FIG. 8, the storage tank 301 additionally includes a front wall 805, which longitudinally extends (in a Y-plane) from the bottom surface 810 to the face 805, and is perpendicular to both the face 505 and the bottom surface 810 (which extend in a Z-plane). The size of the storage tank 301 can be any suitable length, width, and thickness. In some embodiments, the dimensions of the storage tank 301 are as follows: about ~32 inches long (laterally extending from side 815 to side 807) (e.g., plus or minus 5% of ~32 inches), about ~16 inches deep (from front wall 805 to back wall 820, or extending along the length of vehicle 100) (e.g., plus or minus 5% of ~16 inches), to ~7 inches tall (longitudinally extending from the bottom surface 810 to the face surface 505) (e.g., plus or minus 5% of ~7 inches). The storage tank 301 can be may be made from any suitable hard or soft polymer, or other material. For example, in some embodiments, the storage tank 301 is made from rotomolded polypropylene, which is a hard polymer, and which may be of use when custom molding the storage tank 301 to the volume of space 304, as described herein. In other embodiments, however, the storage tank 301 is made from a thermoplastic-polyurethane material and/or other polymers such as low-density polyethylene, high-density polyethylene, polyethylene terephthalate, or other soft plastics such that the storage tank 301 is flexible enough to conform to any surface of any vehicle, as described herein.

Figure 9:
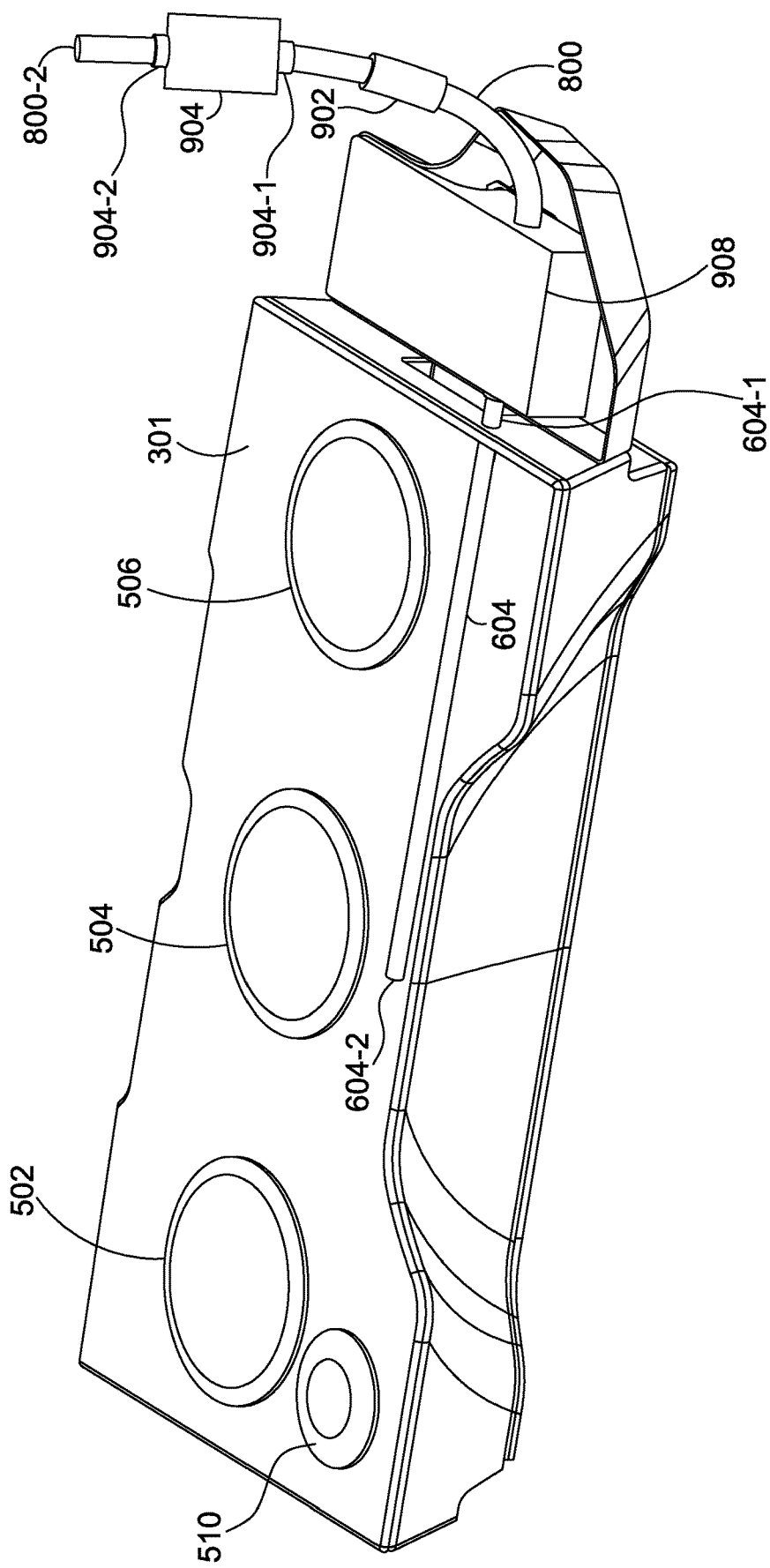
FIG. 9 illustrates a top perspective view of the liquid storage system of FIG. 8, except that the liquid storage system includes an additional housing, a filter component, and a heating component, according to some embodiments.

Turning to FIG. 9, FIG. 9 illustrates a top perspective view of the liquid storage system 302 of FIG. 8, except that the liquid storage system includes an additional housing 908, a filter component 902, and a heating component 904, according to some embodiments. In some embodiments, however, the liquid storage system 302 includes the filter component 902 without the heating component 904, and vice versa. And the housing 908 need not be included in the liquid storage system 302.

The housing 908 houses and substantially covers the entirety of the pump apparatus 303 (except for a portion of the port 303-2). In this way, the pump apparatus 303 is not viewable by a user. Such housing 908 acts as a shell to protect the pump apparatus 303 from getting dirt, soot, water or other substance on its surfaces in order to preserve the shelf-life of the pump apparatus 303 and keep substances from getting into the liquid. The housing 908 is coupled to the mounting component 305 via any suitable methods, such as via screws, adhesive, hook and loop, or the like, and can be removably secured or permanently (or semi-permanently) secured.

The filtering component 902 is coupled to the corresponding interior and exterior portions of the tubing 800. The filtering component 902 is configured to filter the liquid coming into or out of the storage tank 301 via the pump apparatus 303. Filtering means that one or more substances or particles are removed from the liquid so as to at least partially purify or otherwise change the form of the liquid. In some embodiments, the filtering component 902 includes one or more individual filters or layers. For example, the filtering component 902 can include a passive filter (e.g., a carbon sheet, a paper sheet, or mesh) and/or a UV filter. Alternatively or additionally, the filtering component 902 includes a UV sterilization layer, an activated carbon layer, a sand filter, a fabric filter, and/or a screen filter to filter the liquid.

In some embodiments, the filtering component 902 is configured to filter liquid as the liquid is being pumped or otherwise extracted from the storage tank 301 and dispersed out of the end 800-2 of the tubing 800. For example, in response to activating (e.g., vi a switch) the pump apparatus 303, water travels from the end 604-2 of the first tubing 606, to the pump apparatus 303, through the second tubing 800, until it reaches the filtering component 902. After the filtering component 902 filters the water, the water continues to traverse the second tubing 800 until the filtered liquid arrives at the port 904-1 and gets heated via the heating component 904, and then traverses out of the port 904-2 and is dispersed out of the end 800-2. In this way, users can use purified liquid to clean dishes, drink water, or for other purposes where filtered water is useful or necessary.

Alternatively or additionally, in some embodiments, the filtering component 902 filters liquid as it is being pumped into or dispersed into the storage tank 301. For example, in response to activating (e.g., via a switch) the pump apparatus 303, water travels from the end 800-2, to the pump apparatus 303, then through the first tubing 604, and then dispersed into the volume of space 603 at the first end 604-2. In an illustrative example, if the pump apparatus 303 were removable, the pump apparatus 303 can cause water to be pumped or extracted from a water source (e.g., a river or lake) and passed through the filter component 902 and into the volume of space 603 of the storage tank 301. This would ensure that all water in the storage tank 301 is clean and potable so that bacteria, fungus, mold, or other substances do not grow inside the storage tank 301 before the water is pumped back out.

The heating component 904 is coupled, via the ports 904-1 and 904-2, to respective ends of the second tubing 800. The heating component 904 is configured to heat liquid as it is coming into or out of the storage tank 301. In some embodiments, the heating component 904 represents a small electric inline heater, such as an ECOSMART 3.5 heater. In some embodiments, electric inline heaters run off a vehicle's (e.g., vehicle 100 or 200) power, which heats liquid as needed inline with the pump apparatus 303 and filtering component 902. In these embodiments, the heating component 904 may include a cable or other channel (not shown) that connects to the heating component 904 at one end and a battery or other power source within a vehicle at a second end. In some embodiments, however, the heating component

904 need not represent an electric inline heater, but can represent any suitable type of heater to transfer heat to liquid. For example, in some embodiments, the heating component 904 represents a solar component, a heat exchanger component, a propane component, a rod, and/or any component that uses one or more resistors to produce heat.

Figure 10:
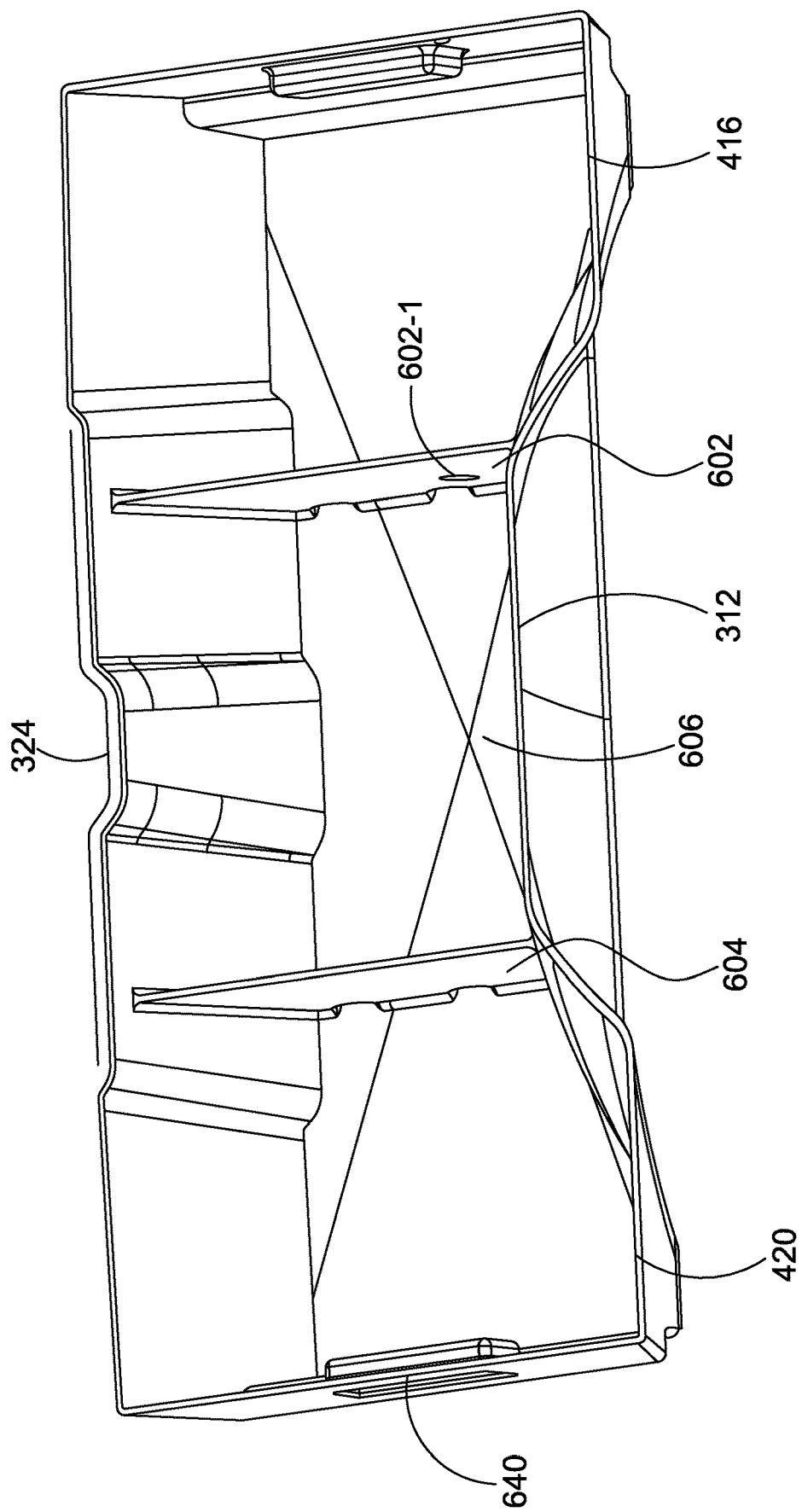
FIG. 10 illustrates a top cross-sectional view of the storage tank of FIG. 3, according to some embodiments.

FIG. 10 illustrates a top cross-sectional view of the storage tank 301 of FIG. 3, according to some embodiments. Such top cross-sectional view illustrates that the face 505 (and corresponding caps 502, 504, and 506) have been removed to illustrate what the volume of space 603 of the storage tank 301 looks like from a top view. As illustrated in FIG. 10, the storage tank itself 301 contains many unique features and contours itself for custom fitting, all of which have been described herein.

The following clauses represent exemplary aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are exemplary in nature and are not limiting.

In some embodiments, a system, such as the system described in any of the embodiments above, comprise a vehicle; a first volume of space in the vehicle, the first volume of space being partially defined by a false floor of the vehicle; a second volume of space below the first volume of space and below the false floor of the vehicle, the second volume of space being partially defined by the false floor and an actual floor of the vehicle; a storage tank within the second volume of space, the storage tank being configured to store liquid; and a pump apparatus within the second volume of space, the pump apparatus being configured to cause the liquid to be extracted from the storage tank and dispersed outside of the storage tank.

In any combination of the above embodiments of the system, the first volume of space at least partially defines a frunk or trunk of the vehicle.

In any combination of the above embodiments of the system, the system further comprises a plurality of dividers within the storage tank, the plurality of dividers defining different sections within the storage tank.

In any combination of the above embodiments of the system, the system further comprises: a cap coupled to a top surface of the storage tank; and an aperture underneath the cap, the aperture being configured to receive the liquid to fill the storage tank when the cap is removed from the top surface.

In any combination of the above embodiments of the system, the system further comprises: a plurality of caps coupled to a top surface of the storage tank; and a plurality of apertures, each aperture, of the plurality of apertures, being underneath a respective cap, of the plurality of caps, each aperture, of the plurality of apertures, being configured to receive a human extremity to clean a respective portion of the storage tank.

In any combination of the above embodiments of the system, the system further comprises: a first handle at a first side surface of a first side of the storage tank; and a second handle at a second side surface of a second side of the storage tank.

In any combination of the above embodiments of the system, the system further comprises a reservoir at a bottom surface of the storage tank, the reservoir being defined by a portion of the storage tank that is raised higher relative to any other portion at the bottom surface.

In any combination of the above embodiments of the system, the system further comprises: a first port at the pump apparatus; and a first tubing with a first end and a second end, the first end being coupled to the first port, the first tubing laterally extending from the first port through the storage tank and at least one divider within the storage tank, the second end being situated at a reservoir of the storage tank.

In any combination of the above embodiments of the system, the system further comprises: a second port at the pump apparatus; and a second tubing that includes an end coupled to the second port, the liquid being configured to be dispersed by being extracted from the storage tank and traversing through the first tubing, the pump apparatus, and the second tubing.

In any combination of the above embodiments of the system, the system further comprises a pressure component within the pump apparatus, and wherein the pressure component is configured to cause the liquid to be pressurized during the dispersion of the liquid, and wherein the water storage tank is not pressurized.

In any combination of the above embodiments of the system, the system further comprises a mounting component coupled to a side or bottom surface of the water storage tank and the mounting component being further coupled to a mounting surface of the pump apparatus.

In any combination of the above embodiments of the system, the system further comprises: a heating component configured to heat the liquid; and a filtering component configured to filter the liquid.

In some embodiments, a system, such as the system described in any of the embodiments above, comprises: a storage tank configured to be placed within a volume of space between a false floor and an actual floor of a vehicle, the storage tank being further configured to store liquid; a mounting component coupled to a first surface of the storage tank; and a pump apparatus coupled to a second surface of the mounting component, the pump apparatus being configured to cause the liquid to be extracted from the storage tank and dispersed outside of the storage tank.

In any combination of the above embodiments of any of the systems described above, the system further comprises a pressure component within the pump apparatus, and wherein the pressure component is configured to cause the liquid to be pressurized for the dispersion of the liquid outside of the storage tank.

In any combination of the above embodiments of any of the systems described above, the system further comprises: a first aperture defining a top surface of the storage tank, the first aperture being configured to receive the liquid to fill the storage tank; and a second set of apertures further defining the top surface of the storage tank, each aperture, of the second set of apertures, being configured to receive a human extremity to clean a respective portion of the storage tank.

In any combination of the above embodiments of any of the systems described above, the system further comprises: a first handle at a first side surface of a first side of the storage tank; and a second handle at a second side surface of a second side of the storage tank.

In any combination of the above embodiments of any of the systems described above, the system further comprises a reservoir at a bottom surface of the storage tank, the reservoir being defined by a portion of the storage tank that is raised higher relative to any other portion at the bottom surface.

In any combination of the above embodiments of any of the systems described above, the system further comprises: a first port at the pump apparatus; a first tubing with a first end and a second end, the first end being coupled to the first port, the first tubing laterally extending from the first port through the storage tank and at least one divider within the storage tank, the second end being situated at a reservoir of the storage tank; a second port at the pump apparatus; and a second tubing that includes an end coupled to the second port, the liquid being configured to be dispersed by being extracted from the storage tank and traversing through the first tubing, the pump apparatus, and the second tubing.

In some embodiments, a system, such as the system described in any of the embodiments above, comprises: a storage tank configured to be placed within a volume of space between a first surface and a second surface of a vehicle, the first surface and the second surface being within an interior section of the vehicle, the interior section being at least partially defined by a floor of the vehicle and a roof of the vehicle, the storage tank being further configured to store liquid; a plurality of dividers defining different sections within the storage tank, the plurality of dividers being configured to prevent sloshing of the liquid; a pump apparatus configured to cause the liquid to be extracted from the storage tank and dispersed outside of the storage tank; and a pressure component within the pump apparatus, wherein the pressure component is configured to cause the liquid to be pressurized for the dispersion of the liquid outside of the storage tank.

In any combination of the above embodiments of any of the systems described above, the system further comprises a mounting component coupled to a first surface of the storage tank, wherein the pump apparatus is coupled to a second surface of the mounting component.

In some embodiments, a storage tank, such as the storage tank described in any of the embodiments above, comprises one or more of the following components: a plurality of dividers configured to prevent sloshing of liquid and divide the storage tank into sections; a reservoir at a central location at a bottom surface of the storage tank; first tubing with a first end and a second end, where the first end is configured to be coupled to a first port of a pump apparatus and the second end is configured to be placed substantially near the reservoir; one or more edges that substantially conform to and/or are designed to fit within surfaces of a volume of space (e.g., a frunk) beneath a false floor of a vehicle, a set of apertures configured to receive one or more objects (e.g., hands, fingers, paper towels) for cleaning the storage tank, an aperture configured to receive (e.g., via a hose) liquid to fill the storage tank, an aperture at a divider, which is configured to receive the first tubing, a first handle and a second handle configured to receive human fingers for moving the storage tank, and a port or aperture at the side surface of the tank configured to receive the first tubing.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and sub combinations are of utility and may be employed without reference to other features and sub combinations and are contemplated within the scope of the claims. Not all steps listed in the various figures need be carried out in the specific order described.

What is claimed is:

1. A system comprising:
a vehicle;
a first volume of space in the vehicle, the first volume of space being partially defined by a false floor of the vehicle, wherein the false floor is a continuous horizontal surface;
a second volume of space below the first volume of space and below the false floor of the vehicle, the second volume of space being partially defined by the false floor and an actual floor of the vehicle;
a storage tank within the second volume of space, the storage tank being configured to store liquid; and
a pump apparatus within the second volume of space, the pump apparatus being configured to cause the liquid to be extracted from the storage tank and dispersed outside of the storage tank.

2. The system of claim 1, wherein the first volume of space at least partially defines a frunk or trunk of the vehicle.

3. The system of claim 1, further comprising a plurality of dividers within the storage tank, the plurality of dividers defining different sections within the storage tank.

4. The system of claim 1, further comprising:
a cap coupled to a top surface of the storage tank; and
an aperture underneath the cap, the aperture being configured to receive the liquid to fill the storage tank when the cap is removed from the top surface.

5. The system of claim 1, further comprising:
a plurality of caps coupled to a top surface of the storage tank; and
a plurality of apertures, each aperture, of the plurality of apertures, being underneath a respective cap, of the plurality of caps, each aperture, of the plurality of apertures, being configured to receive an object to clean a respective portion of the storage tank.

6. The system of claim 1, further comprising:
a first handle at a first side surface of a first side of the storage tank; and
a second handle at a second side surface of a second side of the storage tank.

7. The system of claim 1, further comprising a reservoir at a bottom surface of the storage tank, the reservoir being defined by a portion of the storage tank that is raised higher relative to any other portion at the bottom surface.

8. The system of claim 1, further comprising:
a first port at the pump apparatus; and
a first tubing with a first end and a second end, the first end being coupled to the first port, the first tubing laterally extending from the first port through the storage tank and at least one divider within the storage tank, the second end being situated at a reservoir of the storage tank.

9. The system of claim 8, further comprising:
a second port at the pump apparatus; and
a second tubing that includes an end coupled to the second port, the liquid being configured to be dispersed by being extracted from the storage tank and traversing through the first tubing, the pump apparatus, and the second tubing.

10. The system of claim 1, further comprising a pressure component within the pump apparatus, and wherein the pressure component is configured to cause the liquid to be pressurized during the dispersion of the liquid, and wherein the water storage tank is not pressurized.

11. The system of claim 1, further comprising a mounting component coupled to a side or bottom surface of the storage tank and the mounting component being further coupled to a mounting surface of the pump apparatus.

12. The system of claim 1, further comprising:
a heating component configured to heat the liquid; and
a filtering component configured to filter the liquid.

* * * * *